US011201758B2

(12) United States Patent
Kim et al.

(10) Patent No.: US 11,201,758 B2
(45) Date of Patent: Dec. 14, 2021

(54) METHOD AND APPARATUS FOR CONTROLLING DEVICE

(71) Applicant: SAMSUNG ELECTRONICS CO., LTD., Suwon-si (KR)

(72) Inventors: Jae-Hong Kim, Yongin-si (KR); Kyoung-Jin Moon, Suwon-si (KR); Jae-Ho Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 16/065,588

(22) PCT Filed: Dec. 23, 2016

(86) PCT No.: PCT/KR2016/015236
§ 371 (c)(1),
(2) Date: Jun. 22, 2018

(87) PCT Pub. No.: WO2017/111556
PCT Pub. Date: Jun. 29, 2017

(65) Prior Publication Data
US 2019/0007232 A1    Jan. 3, 2019

(30) Foreign Application Priority Data
Dec. 23, 2015   (KR) .................. 10-2015-0185439

(51) Int. Cl.
*H04L 12/28*    (2006.01)
*H04L 29/08*    (2006.01)
(Continued)

(52) U.S. Cl.
CPC ...... *H04L 12/2829* (2013.01); *G06K 9/00006* (2013.01); *H04L 12/28* (2013.01);
(Continued)

(58) Field of Classification Search
None
See application file for complete search history.

(56) References Cited

U.S. PATENT DOCUMENTS 5,987,106 A    11/1999  Kitamura
7,561,215 B2 *  7/2009  Kim ................. H04N 5/44513
                                                348/734
(Continued)

FOREIGN PATENT DOCUMENTS

CN    104216379 A    12/2014
EP    0 970 580 B1    7/2002
(Continued)

OTHER PUBLICATIONS

Communication dated Oct. 18, 2018, issued by the European Patent Office in counterpart European Application No. 16879423.8.
(Continued)

*Primary Examiner* — Santosh R Poudel
(74) *Attorney, Agent, or Firm* — Sughrue Mion, PLLC

(57) ABSTRACT

The present disclosure relates to a control apparatus and method for a device that has been made intelligent through combination with Internet of Things (IoT) technology. The present disclosure may be applied to intelligent service (for example, smart home, smart building, smart city, smart car or connected car, health care, digital education, small retailers, security and safety-related service, etc.) which is based on IoT-related technology. A method for controlling a first device at the first device according to some embodiments of the present disclosure may comprise the steps of: receiving control state information on a second device from the second device; acquiring a control signal for the first device; on the basis of at least one of the received control state information and the acquired control signal, selecting one from among at least one or more stored control rules; and executing a
(Continued)

control operation for the first device on the basis of the selected control rule.

11 Claims, 12 Drawing Sheets

(51) Int. Cl.
   *H04Q 9/02* (2006.01)
   *G06K 9/00* (2006.01)
(52) U.S. Cl.
   CPC ............ *H04L 12/283* (2013.01); *H04L 29/08* (2013.01); *H04Q 9/02* (2013.01)

(56) References Cited

U.S. PATENT DOCUMENTS

| | | | |
|---|---|---|---|
| 9,849,588 B2* | 12/2017 | Izhikevich | ............... B25J 9/163 |
| 2003/0061606 A1 | 3/2003 | Hartwig et al. | |
| 2008/0071714 A1 | 3/2008 | Menich et al. | |
| 2008/0309822 A1 | 12/2008 | Park | |
| 2009/0299504 A1* | 12/2009 | Kumazawa | ........ G05B 19/4183 |
| | | | 700/83 |
| 2010/0057649 A1 | 3/2010 | Lee et al. | |
| 2011/0178876 A1* | 7/2011 | Karaoguz | ............... G06Q 30/02 |
| | | | 705/14.66 |
| 2012/0265716 A1 | 10/2012 | Hunzinger et al. | |
| 2013/0024884 A1 | 1/2013 | Agnihotri et al. | |
| 2013/0247079 A1* | 9/2013 | Zheng | ................ H04N 21/2407 |
| | | | 725/14 |
| 2014/0078404 A1* | 3/2014 | Cheung | .............. H04N 21/4394 |
| | | | 348/734 |
| 2014/0223498 A1* | 8/2014 | Slemmer | .............. G05B 13/028 |
| | | | 725/80 |
| 2014/0244001 A1 | 8/2014 | Glickfield et al. | |
| 2015/0140990 A1 | 2/2015 | Kim et al. | |
| 2015/0350240 A1* | 12/2015 | Mitchell | ................ H04L 63/30 |
| | | | 726/23 |
| 2016/0211984 A1 | 7/2016 | Takada | |
| 2016/0216934 A1* | 7/2016 | Guy | ........................ G06F 3/165 |
| 2016/0294744 A1* | 10/2016 | Zou | ........................ H04L 67/306 |
| 2016/0364687 A1* | 12/2016 | Matson | ...................... B25F 5/00 |
| 2017/0017231 A1* | 1/2017 | Toyota | ................... G08C 17/02 |
| 2017/0045866 A1* | 2/2017 | Hou | .............. H04L 12/2825 |
| 2018/0257218 A1* | 9/2018 | Hashimoto | .............. B25J 18/00 |
| 2019/0019028 A1* | 1/2019 | Mese | ................. G06K 9/00248 |

FOREIGN PATENT DOCUMENTS

| | | |
|---|---|---|
| KR | 10-2010-0028360 A | 3/2010 |
| KR | 10-2013-0108467 A | 10/2013 |
| KR | 10-2014-0121075 A | 10/2014 |
| WO | 2015/093070 A1 | 6/2015 |

OTHER PUBLICATIONS

International Search Report dated Apr. 25, 2017, issued by the International Searching Authority in counterpart International Application No. PCT/KR2016/015236 (PCT/ISA/210).

Written Opinion dated Apr. 25, 2017, issued by the International Searching Authority in counterpart International Application No. PCT/KR2016/015236 (PCT/ISA/237).

Communication dated May 25, 2020 issued by the State Intellectual Property Office of P.R. China in Chinese Application No. 201680076310.9.

* cited by examiner (a)

(b)

METHOD AND APPARATUS FOR CONTROLLING DEVICE

This application is a National Phase Entry of PCT International Application No. PCT/KR2016/015236, which was filed on Dec. 23, 2016, and claims priority to Korean Patent Application No. 10-2015-0185439, which was filed on Dec. 23, 2015, the contents of which are incorporated herein by reference.

TECHNICAL FIELD

The disclosure relates to methods and apparatuses for controlling devices.

BACKGROUND ART

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). Also, the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries. In particular, IoT-equipped devices are increasing to implement smart homes.

With the Internet spreading since late 1990s in relation to smart homes, high-speed Internet-based home networks (digital homes, smart homes, or intelligent homes) could be implemented, enabling controlling basic home lights and appliances, power, and air conditioners via a network. Further, the wide use of smartphones and applications since late 2000s allowed for implementation of smart homes in which home lights and appliances, power, and air conditioners may remotely be controlled and monitored over a home network. Since mid 2010, IoT devices and intelligent devices became commonplace, leading to IoT-based context cognitive smart homes that may recognize, determine, and control the home environment and context on their own without a human being's involvement.

DETAILED DESCRIPTION OF THE INVENTION

Technical Problem

In such an environment where more and more IoT devices or intelligent devices equipped with wired/wireless communication functionality and a processor are employed to implement an IoT-based context cognitive smart home, users utilize various device control settings to allow their home devices to interwork with each other to fit their preferences in a customized way or to set controls. However, due to the need for dealing with an increasing number of home IoT devices or intelligent devices, users put more time and efforts to initial device control settings for device-to-device interoperation and customized control settings so that the home devices can be controlled in a customized manner. Such a difficulty in the users' initial settings for customized control of devices may be an obstacle to the spread of smart homes.

Meanwhile, in controlling home devices, users tend to show the same or similar use patterns depending on their propensity or preference. As an example, some users may show similar or repeated use patterns in controlling home devices, such as setting the TV to theater mode, the bluetooth speaker connected with the TV volume up, ambient lights off or down, and windows and curtains closed to set the home environment closer to that of a theater when watching movie in their home. As such, users are bothered with repeating the same or similar controls or settings on home devices whenever controlling or carrying out a particular setting on the home devices in the same or similar manner.

According to an embodiment of the disclosure, there are provided a method and apparatus for analyzing the user's use pattern for devices and controlling the devices in an automated or customized manner.

According to an embodiment of the disclosure, there are provided a method and apparatus for controlling a device based on control state information about the device and control state information about an external device.

According to an embodiment of the disclosure, there are provided a method and apparatus for generating a control rule for a device based on control state information about the device and control state information about an external device.

According to an embodiment of the disclosure, there are provided a method and apparatus for generating control state information.

According to an embodiment of the disclosure, there are provided a method and apparatus for obtaining user information contained in control state information.

According to an embodiment of the disclosure, there are provided a method and apparatus for transmitting and receiving control state information.

According to an embodiment of the disclosure, there are provided a method and managing device for controlling devices as per a control rule for devices based on control state information about the devices.

Technical Solution

According to some embodiments of the disclosure, a method for controlling a first device on the first device may comprise receiving control state information of a second device from the second device, obtaining a control signal for the first device, selecting one among at least one or more stored control rules based on at least one of the received control state information and the obtained control signal, and executing a control operation for the first device based on the selected control rule.

According to some embodiments of the disclosure, a first device may comprise a communication unit configured to receive control state information for a second device from the second device and obtain a control signal for the first device, a storage unit configured to store at least one or more control rules, and a controller configured to select one among the at least one or more stored control rules based on at least one of the received control state information and the obtained control signal and perform a control operation on the first device based on the selected control rule.

According to some embodiments of the disclosure, a method for controlling a device by a control rule managing device may comprise receiving control state information for at least one or more devices, selecting one among at least one or more control rules stored in the control rule managing device based on the received control state information, and transmitting control operation change information to at least one device for which a control operation is determined to be performed based on the selected control rule.

According to some external objects of the disclosure, a device may comprise a communication unit configured to transmit control state information for the device to a control rule managing device and receive control operation change information for the device from the control rule managing device, a controller configured to change a control operation for the device based on the received control operation change information, and a storage unit configured to store the changed control operation.

MODE FOR CARRYING OUT THE INVENTION

Figure 1:
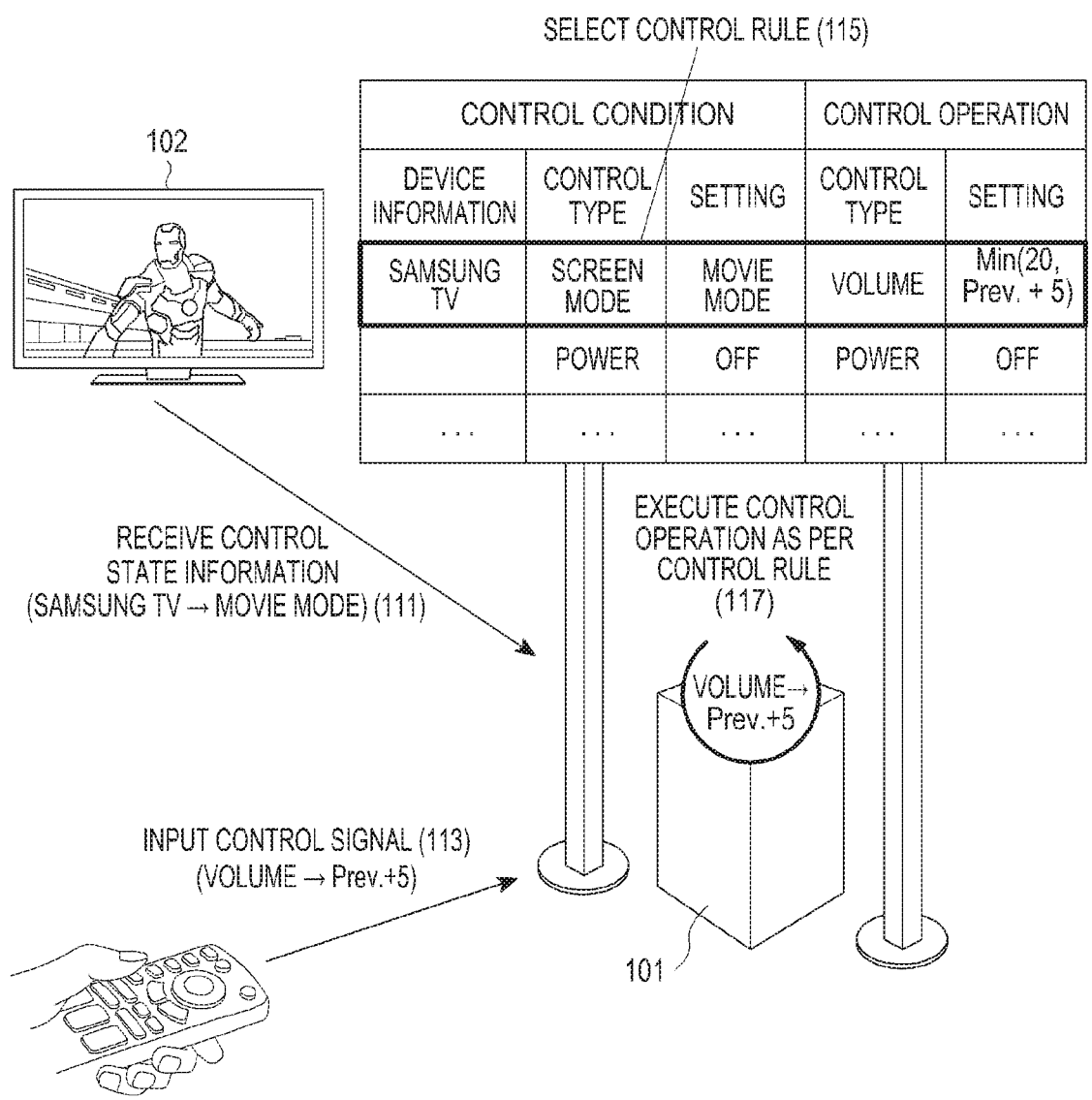
FIG. 1 is a view illustrating a basic concept of an inter-device control operation according to an embodiment of the disclosure.

When determined to make the subject matter of the present disclosure unclear, the detailed of the known functions or configurations may be skipped. Hereinafter, embodiments of the present disclosure are described in detail with reference to the accompanying drawings.

Prior to describing in detail embodiments of the disclosure, the main concept of the disclosure is briefly described.

In the disclosure, where a user controls devices in a particular use pattern, the user's particular use pattern is recognized to generate a control rule for a device, and where a condition meeting the control rule occurs, the control operation for a user control input for the corresponding device is changed, or the device is automatically controlled without the user's involvement.

In some embodiments for the basic concept of the disclosure, when watching horror movies in their home, a certain user A may prefer such a home appliance and device setting as lighting off or down, closing the curtains, speaker volume up, and setting the air conditioner to cooling, and another user B may prefer, e.g., lighting on or up, opening the curtains, and setting the speaker volume to normal. As such, where there a distinctive similar or repeated use pattern is shown in controlling and setting home appliances and devices fitting each user's propensity or preference, the per-user distinctive use pattern may be learned to generate a control rule, and the appliance and device may be controlled as per the control rule in a customized or automated manner.

Prior to describing in detail the disclosure, the major terms used herein are described.

As used herein, "device" may be an object to which the Internet-of-things (IoT) technology is applicable and which may be implemented in various forms. For example, the device may be implemented as an electronic device, e.g., a mobile phone, an installed device, e.g., a light, or a piece of furniture, e.g., a curtain or desk.

As used herein, "control state information" is information indicating a state in which a device is operated. Further, the control state information may be in the form of "mode information" to change at least one or more control states, but is not limited thereto. In some embodiments, the control state information may include device information and device control information.

Further, the control state information may include control count information and user information in addition to the device information and the device control information.

As used herein, "control rule" means a rule to perform a particular control operation on a device or to change the control state of the device if a particular control condition is met for the device. As used herein, "control condition" means a state or element that a device should meet or have to perform a series of control operations or change the control state. The control conditions may be classified into internal control conditions that are control conditions as per the device's own control state change and external control conditions that are control conditions as per sensed information or control state information received from an external device. Further, a control rule may be configured by changing at least one or more control operations or control states and at least one or more control conditions, but is not limited thereto.

As used herein, "control signal" means a signal that is sent out to control the operation or state of a device. For example, a "control signal" may be generated by a user input through an input module, such as a motion (gesture) sensor, touchscreen or button implemented in hardware or software and provided in the device or may be generated through an input tool, such as a motion sensor, touchscreen, or button implemented in hardware or software provided in, e.g., a remote controller, smartphone, tablet PC, wearable device, or accessory that may be used to remotely control the device, but is not limited thereto.

As used herein, "control rule managing device" means a device that receives control state information about devices, generates a control rule, and transmits a control signal to allow any device to perform its control operation or change the control state as per the control rule. The control rule managing device may be a network electronic device, such as a server or relay, a gateway, router, or hub, or may be an electronic device (e.g., a TV, refrigerator, air conditioner, washer, or thermometer) with the same network functionality as the gateway, router, or hub, but is not limited thereto.

In some embodiments, for a bluetooth speaker connected with a TV, a control rule may be to power off the bluetooth speaker upon receipt of information indicating that the TV powers off from the TV. Meanwhile, in some embodiments, there may be a control rule to perform a control operation upon failing to receive control state information from an external device within a predetermined time from the external device, but is not limited thereto. Meanwhile, a control rule may be generated by analysis of the frequency of control and temporal or spatial relationship in control state information between devices for being similarly or repetitively carried out in a predetermined pattern by gathering the control state information about the devices through at least one particular control rule managing device or mutual exchange of the control state information between the devices. Further, the control rule may be distributed and stored in the devices or may be stored in at least one particular control rule managing device, but is not limited thereto.

FIG. 1 is a view illustrating a basic concept of an inter-device control operation according to an embodiment of the disclosure. Although FIG. 1 illustrates only a TV and a bluetooth speaker as devices, this is intended for ease of description, and is not limited thereto.

Step 111 is a step in which under the assumption that the user sets the TV 102 to a movie mode to watch movie, the TV 102 transmits, to the bluetooth speaker 101, control state information containing device information that is information for use to an external device to identify the TV 102, control type information that is information about the type of the controlled operation, and control operation information, so as to send its control state information to the external device. Step 113 is a step in which, where the user performs a control input, e.g., pressing the volume-up button of a remote controller to raise the volume of the bluetooth speaker 101, the bluetooth speaker 101 receives a control signal to raise the volume of the bluetooth speaker 101 from the remote controller. Meanwhile, it is assumed that the bluetooth speaker 101 stores control rules to perform any particular control operation on its own under any particular control condition. In step 115, the bluetooth speaker 101 may select one among the pre-stored control rules based on at least one of the control state information received from the TV 102 and the control signal received from the remote controller. FIG. 1 illustrates an example in which the bluetooth speaker 101 selects a second control rule. In other words, the bluetooth speaker 101 identifies that the control state information of the TV 102 contained in the control state information received from the TV 102 matches the control condition stored in the control rule and performs the control operation corresponding to the control condition. It is assumed here that the volume may be adjusted up to 20 as a volume indication unit, on the bluetooth speaker 101 and the control operation for the control signal to increase the volume of the bluetooth speaker 101 is to increase the preset volume by 5 as a volume adjustment unit. In step 117, the bluetooth speaker 101 performs the control operation corresponding to the selected control rule. That is, as per the control operation contained in the selected control rule, the volume may be increased up to 20 as the volume indication unit, and where the volume does not exceed a maximum of 20 in the volume indication units by the control operation for the control signal to increase the volume of the bluetooth speaker 101 received from the remote controller, the volume which used to be increased by one as the existing volume adjustment unit may be changed to be increased by 5.

As set forth above in the description of the basic concept of the disclosure, in this disclosure, each device may exchange control state information with another, generate and store control rules, and then receives control state information from an external device. Each device, upon receipt of a control signal for itself, selects one among at least one or more control rules stored based on the control state information and the control signal. The control operation for the corresponding device may be performed as per the selected control rule. In some embodiments, the control rules may be stored individually in each device or may be stored only in at least one or more control rule managing devices, but the disclosure is not limited thereto.

Figure 2:
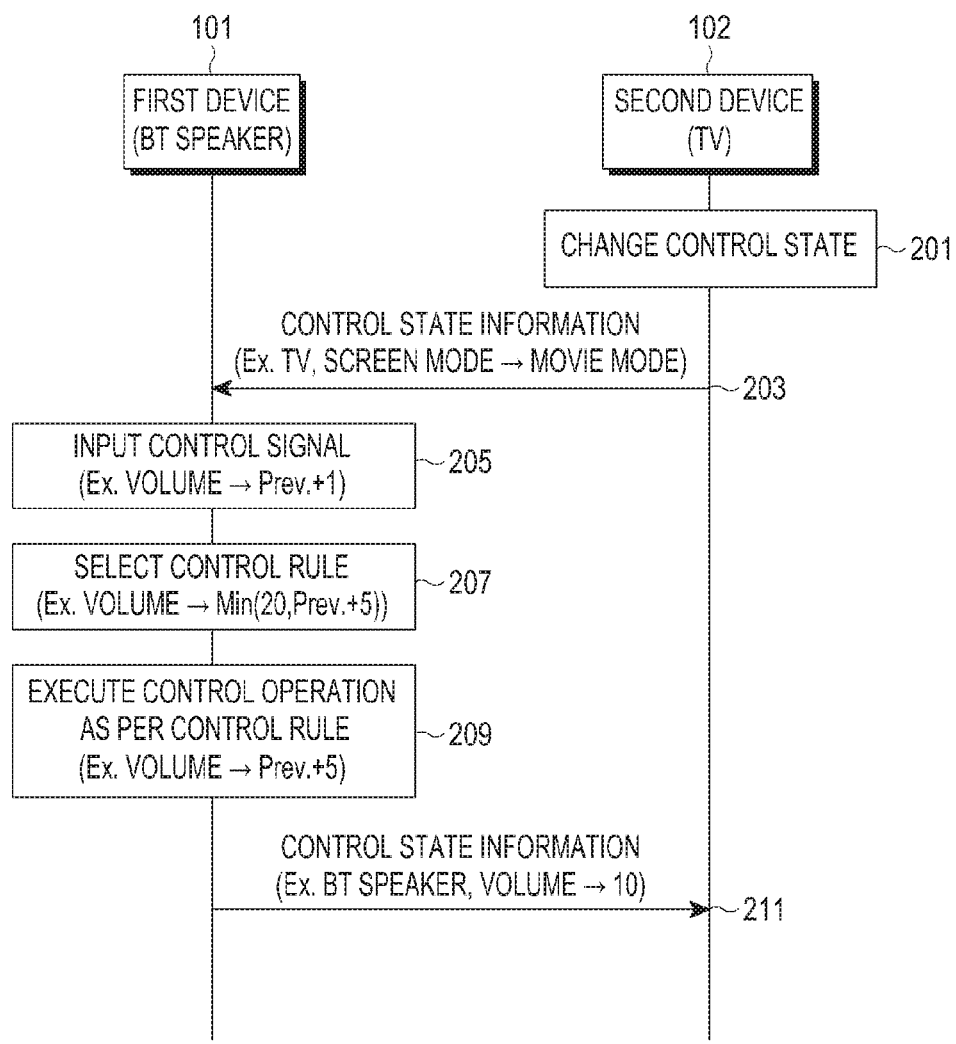
FIG. 2 is a view illustrating an operation of a device as per an inter-device control operation according to some embodiments of the disclosure.

FIG. 2 is a view illustrating an operation of a device as per an inter-device control operation according to some embodiments of the disclosure.

In step 201, a control state for a second device 102 is changed by, e.g., the user. A possible example is that, where the second device 102 is a TV, the user sets the TV to a movie mode. In step 203, the second device 102 transmits control state information about the changed control state to the first device 101. For example, the control state information may contain information to indicate that the screen mode of the TV is changed to a movie mode. The first device 101 may be assumed to be a bluetooth speaker. In step 205, a control signal for the first device 101 is entered. For example, a control signal to increase the volume of the bluetooth speaker by one as the volume adjustment unit may be obtained through the remote controller or the user's button input. In step 207, the first device 101 may select one among the pre-stored control rules based on at least one of the control state information and the control signal. For example, the bluetooth speaker may identify that the device control information (control type and control operation information) and the device information about the TV contained in the control state information received from the TV match the control condition stored in the control rule and selects the control operation corresponding to the control condition. The control operation may be, e.g., to increase the volume by 5 as the volume adjustment unit, with the maximum volume of 20 as the volume indication unit. In step 209, the first device 101 controls the first device 101 as per the selected control rule. In the above example, as per the control operation contained in the selected control rule, if the maximum volume does not exceed 20 as the volume indication unit, the bluetooth speaker changes and perform the control operation to increase the actual volume by 5 as the volume adjustment unit whenever receiving a control signal to increase the volume by one as the volume adjustment unit from the user, starting with the volume set at the last time that the bluetooth speaker was used. In step 211, the bluetooth speaker may broadcast its control state information containing the results of the operation 209. For example, the bluetooth speaker broadcasts its control state information to notify external devices that its current speaker volume is 10 as the volume indication unit.

Figure 3:
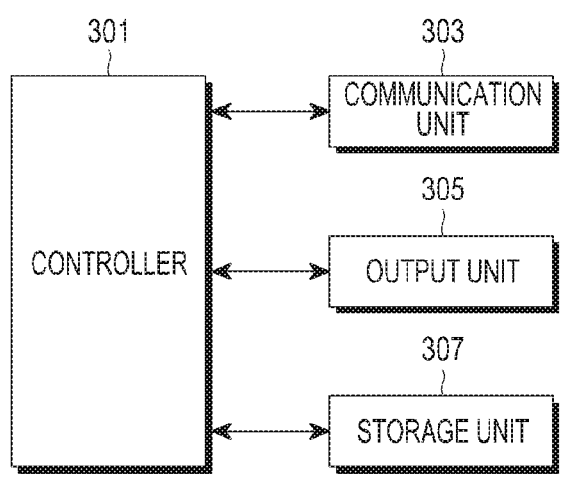
FIG. 3 is a view illustrating a configuration of a device for an inter-device control operation according to some embodiments of the disclosure.

FIG. 3 is a view illustrating a configuration of a device for an inter-device control operation according to some embodiments of the disclosure. Referring to FIG. 3, according to some embodiments, the device may include a controller 301, a communication unit 303, an output unit 305, and a storage unit 307. However, all of the components shown in FIG. 3 are not essential components of the device. The device may be implemented with more or less components than those shown in FIG. 3.

The controller 301 may control the device according to an embodiment of the disclosure and in particular may generate control state information containing the control state of the device. The controller 301 manages the control history for the device and/or other devices to generate control rules and stores the control history in the storage unit 307. Also, the controller 301 may select a control rule based on at least one of a control signal entered for the device and control state information received from the other devices and control the device as per the selected control rule.

The communication unit 303 may transmit or receive messages to/from other external devices. The control state information about the device or control state information about the other devices is transmitted or received through the communication unit 303. In some embodiments, the communication unit 303 for transmitting or receiving messages may further include a wired communication module (not shown) and a wireless communication module (not shown). In some embodiments, the wired communication module (not shown) and the wireless communication module (not shown) may perform wired communication and wireless communication, respectively. As wireless communication schemes, short-range communication schemes and mobile communication schemes may be adopted. For example, the communication unit 303 may employ wireless communication schemes including general cellular communication, such as 3G, 4G, LTE-A, or 5G, Wi-Fi, bluetooth, wireless-LAN (WLAN), BLE, near-field communication (NFC), zigbee communication, zigwave, RFID, infrared (IrDA), or LTE D2D, but the communication schemes are not particularly limited to wireless communication schemes. Meanwhile, the output unit 305 outputs the results of controlling the device by the controller 301. However, the output unit 305 may be omitted depending on the type of the device.

The storage unit 307 may create, and store in, a database for the control history for the device and external device and control rules generated under the control of the controller based on the control history, based on the control signal for the device and the control state information of the external device as used herein, under the control of the controller.

Now described in detail is control state information generated by devices according to embodiments of the disclosure.

In this disclosure, an embodiment of "control state information" containing information about the control state of the device is shown in Table 1 below.

TABLE 1

| Essential information | | Additional information (optional) | |
|---|---|---|---|
| Device information | Device control information | Control count | User information |
| Device type | Device UID | Control type | Control operation | (hop count) | Identification information |
| TV | SUHD-132 | Screen mode | Movie mode | 0 | Kim's fingerprint/ device |

Referring to Table 1, the control state information may include device information and device control information. In some embodiments, the device information and the device control information in the control state information may be essential information. The control state information may further control count information and user information, but is not limited thereto.

In some embodiments, the control state information may be information transmitted generally to notify external devices that a variation in the control state occurs in the device. In other words, where a particular event occurs in the device, the control state information may be sent out to indicate the event. Further, depending on the settings in the device, the control state information may be sent out at predetermined cycles even when no variation in the control state or no particular event occurs, but the disclosure is not limited thereto.

The components of the control state information are described below.

—Device Information

As used herein, "device information" is information used to identify the device and may contain device type information and device unique identifier (UID) information. For example, the device type information about the TV 102 may be 'TV,' and the device unique identifier (UID) information about the TV 102 may be a string constituted of letters, symbols, and numbers which is vendor-specific as defined by the manufacturer, such as "SUHD-132." Besides, as the device information, the model name or serial number of the device may be used, and the device information is not limited to particular information as long as it may be used to identify the device.

In some embodiments, in the example of Table 1, the device type is 'TV,' and the ID of the device may be written in the form of a string constituted of unique letters, symbols, and letters, such as "SUHD-132."

—Device Control Information

As used herein, "device control information" is information specifying the control operation performed by the device. For example, the device control information may include, but is not limited to, control type information to specify the type or function of the control operation controlled and control operation information to specify the set value or state changed as the result of the control operation. In some embodiments, in the example of Table 1, the control type may be controlling the "screen mode," and the control state may be "movie mode."

—Control Count

As used herein, "control count information" means information about a particular device related to performing a control operation on the particular device. For example, "control count information" may mean the total number of all the devices associated with a control condition to perform a control operation. In other embodiments, when the device is controlled by a control signal, the control count information may be expressed as '0,' and where the device is controlled by a control rule selected based on the control state information received from the external device, the control count information may be expressed as "1," but without being limited thereto. In some embodiments, in Table 1 above, the control count is set as "0," and this may be why the user has directly controlled the device. Where the control count is marked, a control rule may be selected based on control state information received from the other device, and where the control operation is performed as per the selected control rule, such marking may occur, but without being limited thereto.

For example, in the example of FIG. 1 or 2, the bluetooth speaker receives control state information about the TV and selects a control rule based on the TV control state information, and the bluetooth speaker is controlled as per the selected control rule. In such case, the control count becomes "1." In some embodiments, where the bluetooth speaker, after being controlled, broadcasts again its control state information as in step 211 of FIG. 2, another device, e.g., a computer, receiving the control state information from the bluetooth speaker, selects a control rule based on the control state information of the bluetooth speaker. Where a control operation is performed on the computer as per the selected control rule, the control count value in the control state information to be re-broadcast from the computer may be marked "2." Summing up the above example, the control count value may be consecutively increased by 1 whenever the control operations are sequentially performed on the devices as per the control rules of the control state information of their prior devices from the TV through the bluetooth speaker to the computer. By such process, the control count may become the number of the prior devices related to the control operation of the current device. In this sense, the "control count" may also be referred to as a "hop count." The terms "control count" and "hop count" may interchangeably be used hereinafter, without being limited thereto.

—User Information

As used herein, "user information" means information to identify the user who has transmitted or entered the control signal to the device. For example, as the user information, the following information may be used, but not limited to: the user's biometric information (fingerprint, iris, cornea, finger vein, electroencephalogram (EEG), electrocardiogram (ECG), face, or voice pattern); or information about the device used by the user such as device ID, device unique identifier (UID), or device serial number.

In some embodiments, the information about the device used by the user may be, e.g., unique identifier information (UID) information about the user's smartphone, smartwatch, or other personal portable device. For example, Table 1 shows that as the user information, the fingerprint of the user, Kim, and the ID of his device are used together, but without being limited thereto.

Meanwhile, the user information may be obtained differently depending on, but not limited to, whether the user controls the device directly or indirectly via an external control device, e.g., a remote controller, and whether the external control device is intended for public use or private use or only for the user. This is described below in connection with FIGS. 5 to 7.

Now described are schemes for generating control rules by devices according to embodiments of the disclosure.

In this disclosure, each device may create into a database a control history for itself and a control history for an external device, generate control rules to control the device from the database, and create the control rules into a database. In some embodiments, a database is described that is managed by a curtain control device for automatically controlling a curtain.

Table 2 below shows an embodiment for a control history database for an external device managed by the curtain control device.

TABLE 2

| time | Device information | | Device control information | | Control count | User information |
|---|---|---|---|---|---|---|
| | Device type | Device UID | Control type | Control operation | (hop count) | Identification information |
| 09:00 AM | speaker | SC/10A | volume | 10 | 0 | Kim's fingerprint |
| 10:00 AM | light | Shinla_12 | power | ON | 0 | Moon's iris |
| 1:00 PM | TV | Samsung_2341 | Screen mode | Movie mode | 0 | Kim's fingerprint |
| ... | ... | ... | ... | ... | ... | ... |

The curtain control device may create, and store in, a database for control state information received from the external device. Referring to Table 2, in some embodiments, based on the control state information received from the speaker with the device unique identifier (UID) information "SC/10A," information indicating that the volume of the speaker (SC/10A) was controlled to "10" as the volume indication unit at 09:00 AM, and at this time, the control count was "0" and the user information was "Kim's fingerprint information" may be stored in the database in the curtain control device. In some embodiments, based on control state information received from a light with the device unique identifier (UID) information "Shinla_12," information indicating that the light (Shinla_12) powered on at 10:00 AM, and at this time, the control count was "0" and the user information was "Moon's iris information" may be stored in the database in the curtain control device. Likewise, based on control state information received from a TV with the device unique identifier (UID) information (Samsung_2341), information indicating that the TV (Samsung_2341) was set to "movie mode" at 1:00 PM, and at this time, the control count was "0" and the user information was "Kim's fingerprint information" may be stored in the database in the curtain control device. The control histories for the external devices may be implemented in a single database based on the order of time of receiving the control state information for all the devices as exemplified in Table 2 or may be individually created and managed in databases, but not limited thereto. Further, the control time information about the device stored in the control history may be signified as the exact time of obtaining the control state information such as 1:00 PM as set forth in Table 2, or as a particular time zone clustered, e.g., morning, afternoon, evening, or dawn, or only the order of occurrence of events may be signified, but without being limited thereto.

Table 3 below represents an example in which the control history for the curtain control device itself has been created into a database.

TABLE 3

| time | Device control information | | | User information |
|---|---|---|---|---|
| | Control type | Control operation | Control count (hop count) | Identification information |
| 8:00:00 AM | Control opening/closing | Open | 0 | Moon's iris |

TABLE 3-continued

| time | Device control information | | | User information |
|---|---|---|---|---|
| | Control type | Control operation | Control count (hop count) | Identification information |
| 1:05:00 PM | Control opening/closing | Close | 0 | Kim's fingerprint |
| ... | ... | ... | ... | ... |
| ... | ... | ... | ... | ... |

Referring to Table 3, in an embodiment, the curtain control history indicating that the curtain was opened by the user "Moon" at 08:00 AM based on the user information that is Moon's iris information, and the curtain was closed by the user "Kim" at 1:05 PM based on the user information that is Kim's fingerprint information. In some embodiments, the information may be stored in the database based on the temporal order of being controlled as set forth in Table 3. As set forth in Tables 2 and 3, the control history for the external device and the control history for the device may be configured in separate databases, but without being limited thereto, the control history for the external device and the control history for the device may be configured in a single integrated database. In some embodiments, the control time information stored in the control history for the device may be signified as the exact time of obtaining the control state information such as 1:00 PM as set forth in Table 2, or as a particular time zone clustered, e.g., morning, afternoon, evening, or dawn, or only the order of occurrence of events may be signified, but without being limited thereto.

Table 4 below shows an embodiment in which the curtain control device generates control rules and creates a database for the control rules based on Tables 2 and 3 above. In some embodiments, the control rules may be generated as per the temporal or spatial correlation between the control history for the external device and the control history for the device. Further, in some embodiments, where the difference between the time when the control history for the external device occurs and the time when the control history for the device occurs is within a particular threshold, one control rule may be generated that takes the control history for the external device as a control condition and the control history for the device as a self control rule. For example, where the time of having received the control state information indicating that the screen mode has been changed to "movie mode" from the TV with the device unique identifier (UID) information "Samsung_2341" is "1:00 PM" as set forth in Table 2, and the time when the curtain control device has changed the state to "close" is "1:05 PM" as set forth in Table 3, if the difference between the time of receipt of the control state information of the external device and the device control time is within the threshold, e.g., 10 minutes, a control rule may be generated based on the control history for the external device and the control history for the device.

TABLE 4

| External device information | | External device control information | | Self control rule | | | Whether control rule active or not | Re-control count | User information |
|---|---|---|---|---|---|---|---|---|---|
| Device type | Device UID | Control type | Control operation | Control type | Control operation | Control count | | | Identification information |
| TV | Samsung_2341 | Screen mode | Movie mode | Control opening/closing | close | 11 | ON | 0 | Kim's fingerprint |
| ... | ... | ... | ... | ... | ... | ... | ... | ... | ... |

The curtain control device may analyze the control history for the electronic device of Table 2 and the control history for the device of Table 3, generating a control rule as set forth in Table 4. In some embodiments for the control rule, referring to Table 4, the curtain control device's receipt of the control state information indicating that the screen mode of the TV with the device unique identifier (UID) information "Samsung_2341" has been set to the movie mode may become a control condition for the control rule, and where the control condition is met, the control rule of performing the control operation of "closing" the curtain may be generated. In some embodiments, the control conditions for control rules may be classified into internal control conditions that are control conditions as per the device's own control state change and external control conditions that are control conditions as per sensed information or control state information received from an external device. In configuring control rules, control conditions may include a plurality of internal or external control conditions, and control operations may include a plurality of control operations for the device, but is not limited thereto.

In some embodiments, the corresponding control rule may include control count information that is information about the number of times in which the same control has occurred. For example, where the control state information indicating that the screen mode of the TV with the device unique identifier (UID) information "Samsung_2341" has been set to the movie mode, and controlling is repeated 11 times as per the control rule under which the control operation is performed in the state of "closing" the curtain, the control count information about the control rule may be contained and stored as "11" in the control rule. Further, in some embodiments, the control count information may be used as information to determine whether to activate the control rule. In some embodiments, the control rule may be activated and used only when the control count is a threshold or more, and after the control rule is activated, the control rule may be used to control the device as an actual control rule. For example, where the control count for the same control rule as that stored is five times or more, the control rule may be activated and used, but is not limited thereto.

Meanwhile, in some embodiments, in relation to the control count, the control operation included in the control rule may be changed as per the control count, thereby varying the control rule. For example, in the example of the TV and the bluetooth speaker described above in connection with FIG. 2, the control rule has been described in which the volume of the bluetooth speaker is increased by five as the volume adjustment unit. However, if the control count of the device which is performed similar to the corresponding controller is a predetermined threshold or more, then the control operation may be changed and set to increase the volume not by five as the volume adjustment unit but by more than five.

Tables 5 and 6 below represent some embodiments in which the details of the control operation are determined as per the number of times in which the control rule is executed, i.e., the control count.

TABLE 5

| Control count = 10 | |
|---|---|
| Control type | Control operation |
| Volume | Min(20, Prev.+5) |

TABLE 6

| Control count = 50 | |
|---|---|
| Control type | Control operation |
| Volume | Min(20, Prev.+10) |

In other words, where the control count is 10 or more in Table 5 above, the volume control operation is "Min(20, Prev.+5)," but where the control count is 50 or more in Table 6, the volume control state is "Min(20, Prev.+10)." That is, where the maximum volume which is the existing control operation setting for the volume is 20 as the volume indication unit, and where the volume does not exceed 20 as the volume indication unit, the volume is adjusted by five as the volume adjustment unit in the preset volume level, but where the control count exceeds 50, the control operation may be changed to adjust the volume by 10.

In some embodiments, as set forth above in connection with Tables 2 to 4, each device may create a database for the control history for the external device from the control state information received from the external device, create a database for the control history for the device, and generate control rules from inter-device operations performed repetitively therefrom. The flowchart of the operations of the device as set forth above in connection with Tables 2 to 4 may be configured as shown in FIG. 4.

Figure 4:
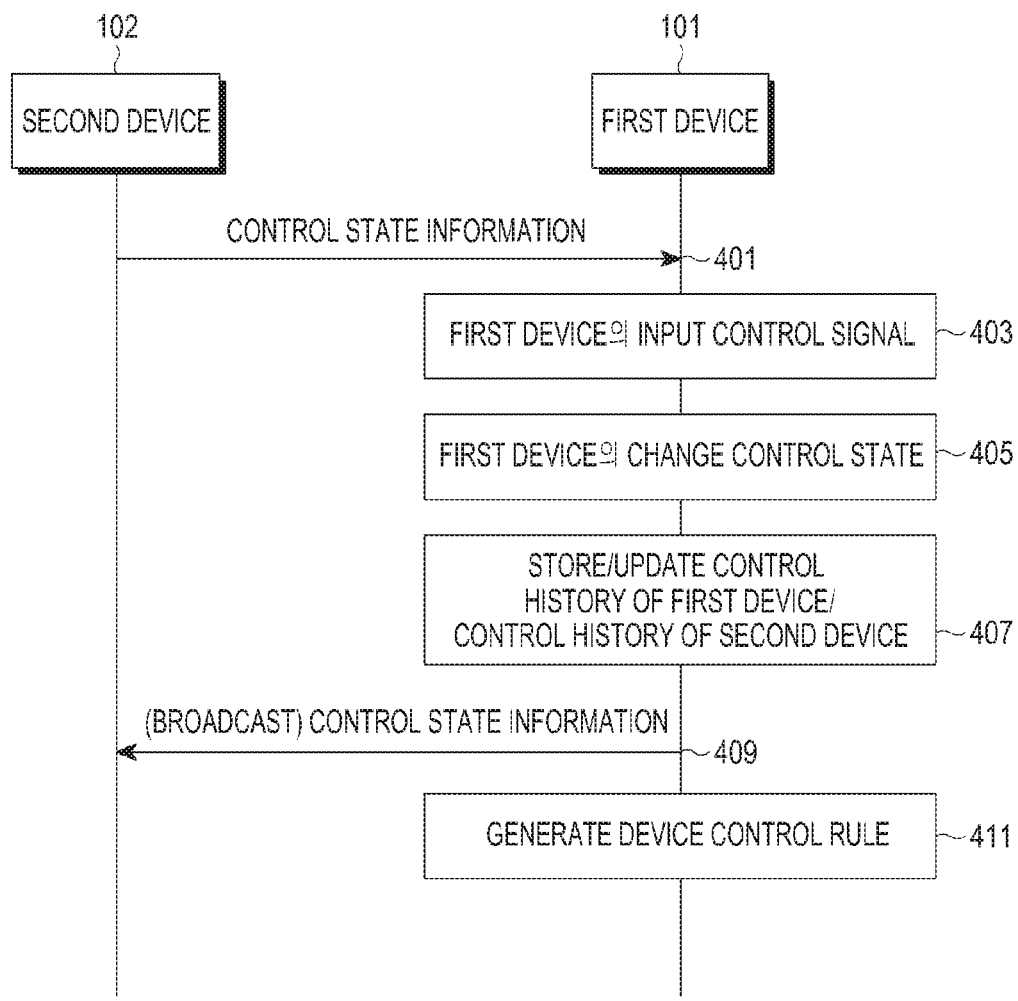
FIG. 4 is a flowchart of a control rule generation rule illustrating the operation of generating a control rule by a device according to some embodiments of the disclosure.

FIG. 4 is a flowchart of a control rule generation rule illustrating the operation of generating a control rule by a device according to some embodiments of the disclosure.

In step 401, the first device 101 may receive control state information of the second device 102. In step 403, the first device 101 may obtain a control signal of the first device 101. In step 405, the first device 101 may change the control state of the first device 101 as per the obtained control signal. In step 407, the first device 101 may store or update the control history of the first device 101 and/or the control history of the second device 102. In step 409, the first device 101 may broadcast its control state information. Thereafter, in step 411, the first device 101 may determine whether there are inter-device control operations performed simultaneously within a predetermined time based on the control history of the first device 101 and the control history of the second device 102 and generate control rules based on the results of the determination.

Although FIG. 4 illustrates only one second device 102, this is for ease of description. There may be a plurality of second devices 102 that represent external devices. Further, although steps 401 and 403 are sequentially illustrated, the order may be reversed, but without being limited thereto. Accordingly, upon obtaining the control signal for the first device 101 or receiving the control state information from the second device 102 which is an external device, the first device 101 may store and update the control history for the first device 101 or the second device 102.

Now described are examples of operations performed after a control rule is generated by the above-described process.

The following examples assume operations after the certain control device receives the control state information from the TV.

Table 7 below represents some embodiments about control state information that the curtain control device receives from the TV. This may correspond to the operation of step 203 of FIG. 2.

TABLE 7

| Device information | | Device control information | | Control count | User information |
|---|---|---|---|---|---|
| Device type | Device UID | Control type | Control operation | (hop count) | Identification information |
| TV | Samsung_2341 | Change mode | Movie mode | 0 | Kim's fingerprint/ device |

Referring to Table 7, it can be grasped based on the control state information received from the TV that the TV (Samsung_2341) has been set to the movie mode by Kim.

Having received the control state information of Table 7, the curtain control device may check whether the pre-stored control rules include one corresponding to the control state information of the TV, and if so, may select the corresponding control rule. This may correspond to the operation of step 207 of FIG. 2.

Table 8 below represents some embodiments in which the curtain control device checks the control rules corresponding to Table 7 and selects one control rule among at least one control rule.

TABLE 8

| External device information | | External device control information | | Device control rule | | | Whether control rule active or not | Re- control count | User information |
|---|---|---|---|---|---|---|---|---|---|
| Device type | Device UID | Control type | Control operation | Control type | Control operation | Control count | | | Identification information |
| TV | Samsung_2341 | Screen mode | Movie mode | Control opening/closing | close | 10 | ON | 0 | Kim's fingerprint |
| ... | ... | ... | ... | ... | ... | ... | ... | ... | ... |

In some embodiments, referring to Table 8, upon receiving the control state information indicating that the screen mode of the TV with the device unique identifier (UID) information "Samsung_2341" as the control rule corresponding to Table 7 has been changed to the movie mode, the curtain control device may perform the control operation of closing the curtain as per the rule for performing the control operation of closing the curtain.

In some embodiments, based on the control rule of Table 8, the curtain control device having controlled the curtain may update the control history for the curtain based on the changed control state of the curtain. In some embodiments, Table 9 below represents some embodiments in which the control history of the curtain is updated.

TABLE 9

| time | Device control information | | User information | |
|---|---|---|---|---|
| | Control type | Control operation | Control count (hop count) | Identification information |
| 1:05:00 PM | Control opening/closing | close | 1 | Kim's fingerprint |

In some embodiments, referring to Table 9, the control history that the curtain has been closed around 1:05 PM may be created into, and stored in, a database as a control history of the curtain control device. The user of the control operation being Kim may be identified through the user information, "Kim's fingerprint information." Meanwhile, in some embodiments, unlike in Table 3, where controlling as per the control rule is performed as shown in Table 9, the control count information may be updated and marked "1." For example, the reason why the control count information for the corresponding control history is updated to "1" in Table 9 is that the current control of the curtain is, rather than the direct control by the user "Kim," the result of performing the curtain control operation based on the control state information received from the external device, i.e., the TV.

Further, the curtain control device having controlled the curtain as per Table 8 above may update the control rule for the curtain as per Table 8 as the control state of the curtain changes. Table 4 set forth above is an embodiment obtained as a result of updating the control rule of the curtain of Table 8.

As compared with Table 8, what is changed in Table 4 is the "control count" item. That is, although in Table 8 the control count information is "10," the control count value in Table 4 may be increased by one, i.e., updated to "11." This may be attributed to the fact that the curtain control operation has been performed as per the control rule of Table 8 as set forth above.

Meanwhile, since the curtain control device has controlled the curtain as per Table 8 above, it may generate new control state information and broadcast the generated control state information to other external devices. This may correspond to the operation of step 211 of FIG. 2. In some embodiments, the terminal may broadcast only its own control state information or may broadcast to the external devices the control state information of the prior external device which may be the cause for the control, as well as its own control state information. This is described below in connection with Tables 11 and 12.

Table 10 represents an embodiment for control state information broadcast from the curtain control device where the control operation is performed as per the control rule.

TABLE 10

| Device information | | Device control information | | Control count | User information |
|---|---|---|---|---|---|
| Device type | Device UID | Control type | Control operation | (hop count) | Identification information |
| Curtain | Curten_ho_21 | Control opening/ closing | close | 1 | Kim's fingerprint/ device |

As set forth above in connection with Table 10, the control state information may be configured with only the control state information regarding the corresponding device.

Table 11 represents an embodiment for control state information broadcast from the curtain control device where the control operation is performed as per the control rule.

TABLE 11

| Device information | | Device control information | | Control count | User information | Device information | | Device Control information | | Control count | User information |
|---|---|---|---|---|---|---|---|---|---|---|---|
| Device type | Device UID | Control type | Control operation | (hop count) | Identification information | Device type | Device UID | Control type | Control operation | (hop count) | Identification information |
| curtain | Curten_ho_21 | Control opening/ closing | close | 1 | Kim's fingerprint/ device | TV | Samsung_2341 | Change mode | Movie mode | 0 | Kim's fingerprint/ device |

As set forth above in connection with Table 11, the control state information may be configured to include the control state information of the curtain control device, which is the control state information regarding the device, and the control state information of the TV, which is the control state information of the prior external device that is the cause for the control.

Now described is a scheme for obtaining user information that may be contained as additional information in the control state information of Table 1.

Schemes in which the user controls the device may largely be classified into direct control schemes and indirect control schemes. Direct control schemes may be schemes in which the user directly controls the corresponding device without another external control device, e.g., a remote controller, such as by pressing a hardware or software button of the device. Indirect control schemes may be schemes in which the user indirectly controls the device using an external control device, e.g., a remote controller. Meanwhile, the external control device may be a shared external control device such as a remote controller that may be shared or a private external control device such as a smartwatch, smartphone, or portable terminal, but not limited thereto.

In some embodiments, schemes in which the device obtains user information by direct control and by indirect control are described below.

Figure 5:
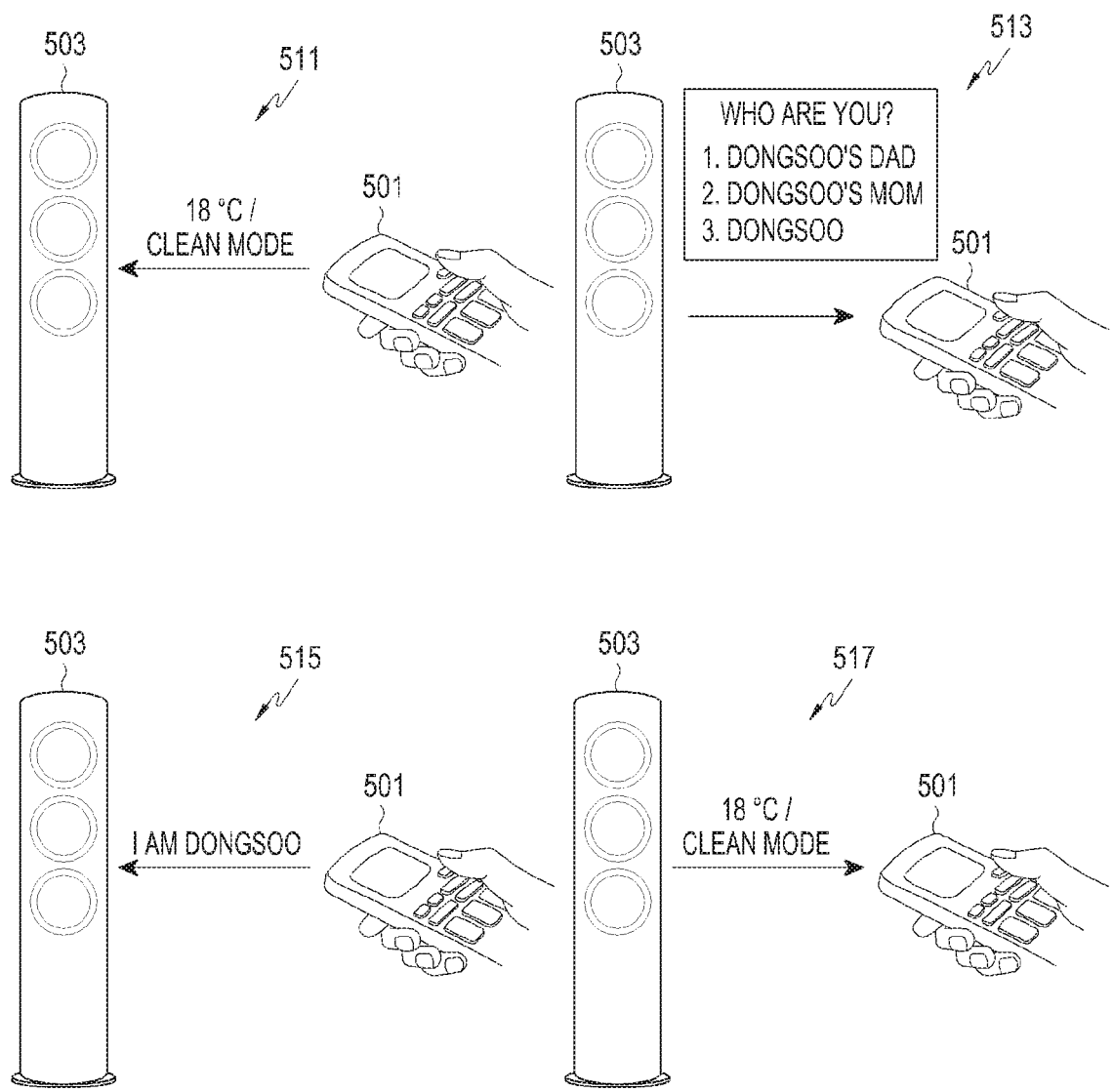
FIG. 5 is a view illustrating an example in which a device obtains user information where a user indirectly controls the device using an external control device according to some embodiments of the disclosure.

FIG. 5 is a view illustrating an example in which a device obtains user information where a user indirectly controls the device using an external control device according to some embodiments of the disclosure.

In some embodiments, FIG. 5 assumes the scenario in which an air conditioner 503 is controlled using a shared remote controller 501.

In step 511, the remote controller 501 may transmit a control signal to control the air conditioner 503 to the air conditioner 503. For example, as per the embodiment of FIG. 5, the remote controller 501 may transmit a control signal to set the desired temperature to 18° C. and to control in a clean mode as the operation mode to the air conditioner 503. In step 513, the air conditioner 503 may transmit to the remote controller 501 a requesting message for user information to obtain information about the user who enters the control signal. For example, a window screen to receive user information may be displayed on the remote controller 501, but the screen to receive user information is not limited thereto. For example, FIG. 5 illustrates an embodiment in which the air conditioner 503 transmits to the remote controller 501 a message including "Who are you? 1. Dongsoo's dad 2. Dongsoo's mom 3. Dongsoo" to request user information, and the remote controller 501 shows the message to the user in a window. In step 515, the remote controller 501 having received the user information may transmit the received user information to the air conditioner 503. For example, FIG. 5 illustrates the example in which the user information "Dongsoo" has been entered to the remote controller 501, and the entered user information "Dongsoo" is sent to the air conditioner 503. In step 517, the air conditioner 503 may broadcast its control state information including the user information. For example, in the embodiment of FIG. 5, the control state information of the air conditioner 503, i.e., "18° C./clean mode," has been broadcast. However, although the user information "Dongsoo" is not contained in the control state information, the user information "Dongsoo" may also be included in the control state information as set forth above.

Figure 6:
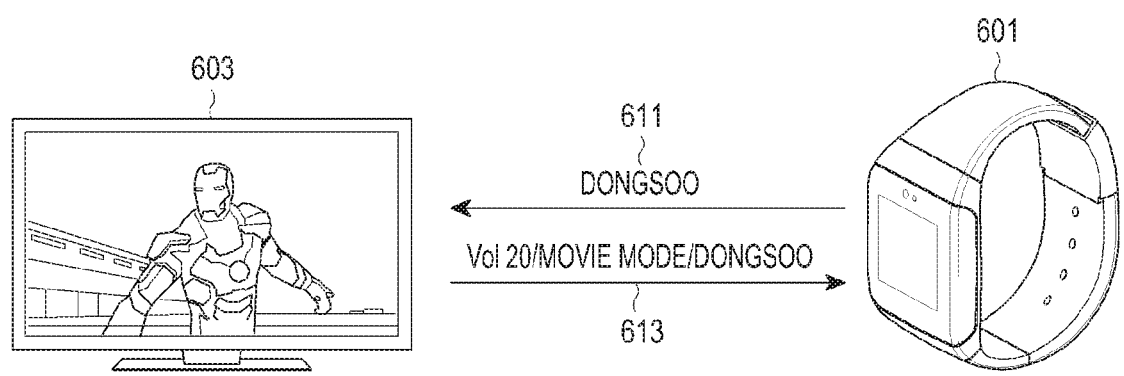
FIG. 6 is a view illustrating an example in which a device obtains user information where a user indirectly controls the device using a personal external control device according to an embodiment of the disclosure.

FIG. 6 is a view illustrating an example in which a device obtains user information where a user indirectly controls the device using a personal external control device according to an embodiment of the disclosure.

In some embodiments, FIG. 6 assumes the scenario in which a TV 603 is controlled using a wearable device, i.e., smartwatch 601. In step 611, the smartwatch 601 may transmit a control signal to control the TV 603, along with user information. The user information may include at least one of the device unique identifier (UID) information about the smartwatch 601 or device information to identify the device, such as a device serial number and the user's biometric information such as the user's fingerprint, iris, face recognition, or voice pattern information. In step 613, the TV 603 may broadcast control state information including the user information.

FIGS. 7a to 7d are views illustrating an example in which a device obtains user information where a user directly controls the device according to some embodiments of the disclosure. FIGS. 7a to 7d are ones obtained by dividing a single FIG. 700 for ease of description.

That is, FIG. 7 illustrates an example in which the user directly controls the air conditioner 701 to set the desired temperature to 18° C. and the operation mode to the clean mode and the air conditioner 701 obtains user information from external devices 702, 703, and 704. This is described below in detail with the drawings.

Figure 7A:
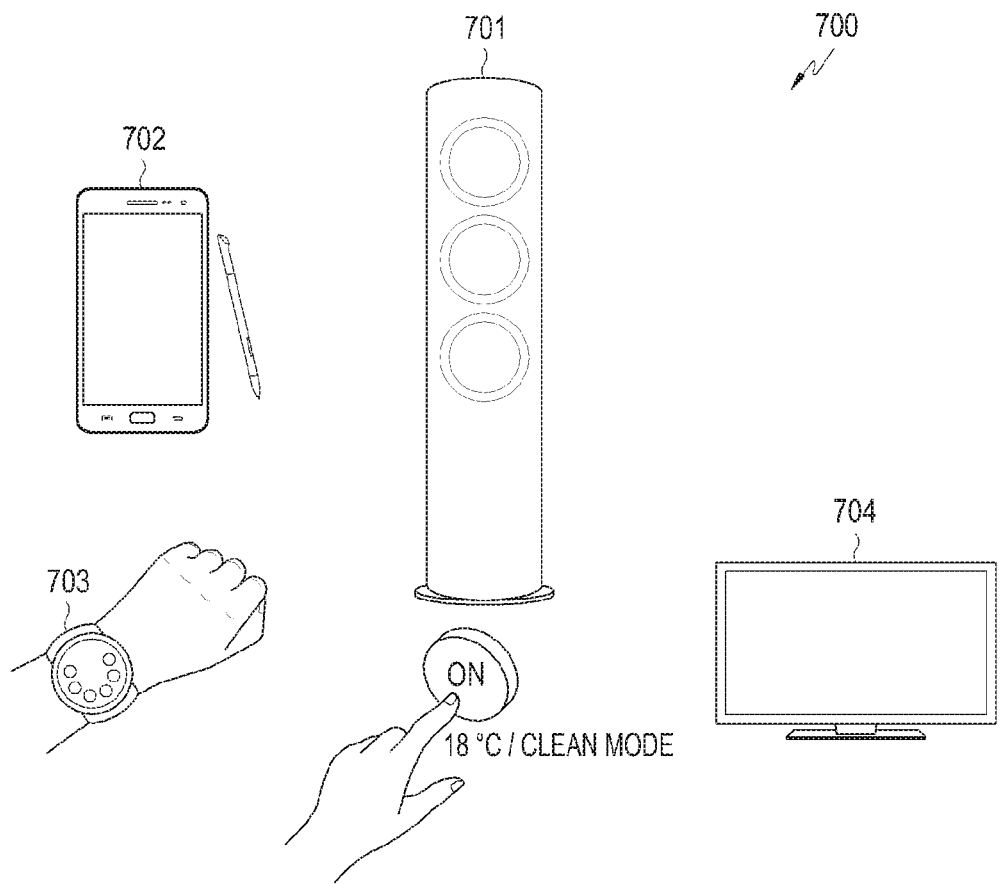
FIGS. 7a to 7d are views illustrating an example in which a device obtains user information where a user directly controls the device according to some embodiments of the disclosure.
Figure 7B:
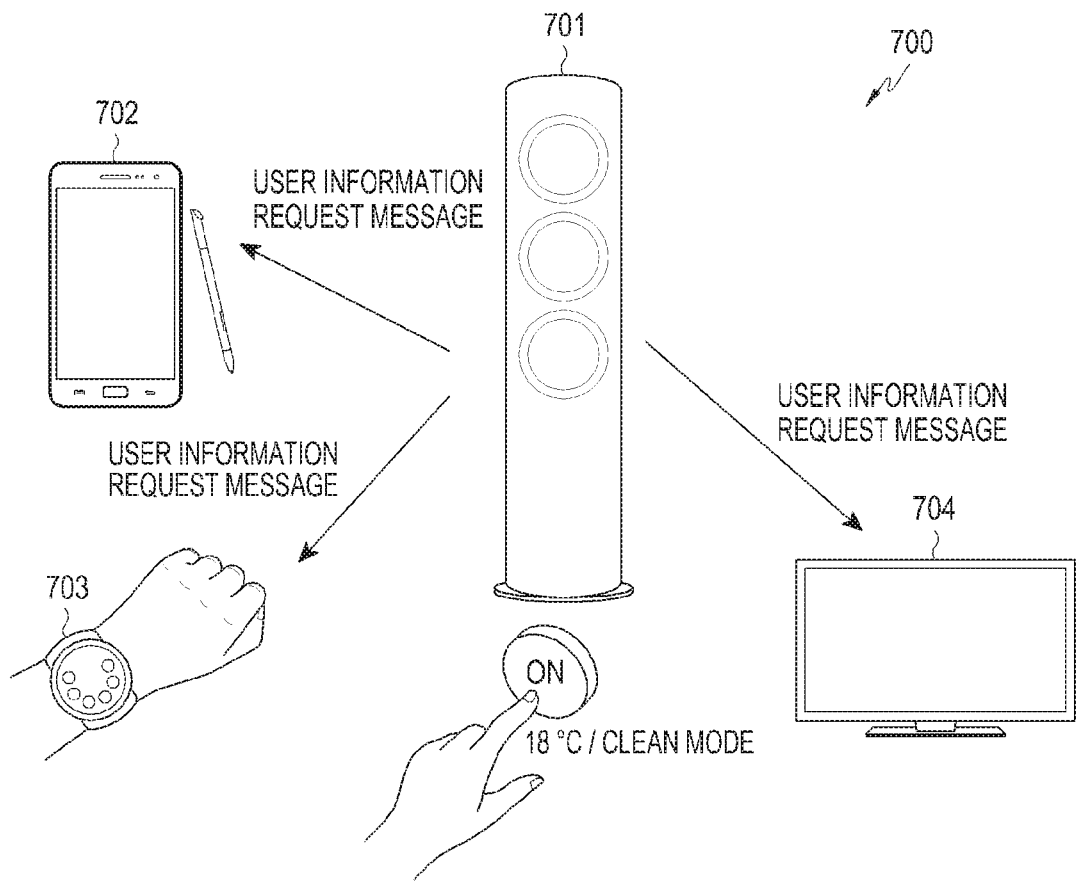

In FIG. 7a, the user may directly control the air conditioner 701. For example, the user may directly control the air conditioner 701 at the desired temperature of 18° C. and in the operation mode of the clean mode. External devices, e.g., the smartphone 702, the smartwatch 703, and the TV 704 may be around the air conditioner 701. In FIG. 7b, the air conditioner 701 may broadcast user information request messages for user information to the ambient external devices 702, 703, and 704.

Figure 7C:
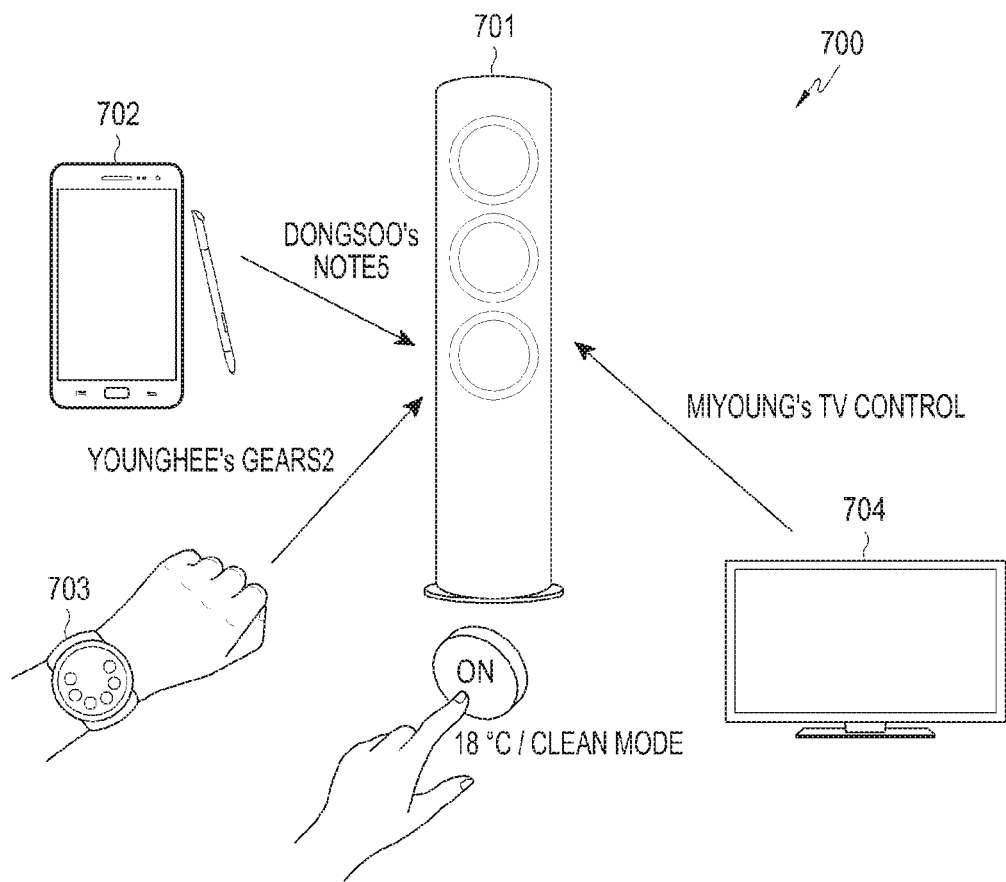

In FIG. 7c, the ambient external devices 702, 703, and 704 may send user information that they may provide to the air conditioner 701. For example, the smartphone 702 may send its user information "Dongsoo" to the air conditioner 701, and the smartwatch 703 may send its user information "Younghee" to the air conditioner 701. The TV 704 may send "Miyoung" which is information about the user currently controlling the TV 704 to the air conditioner 701.

Figure 7D:
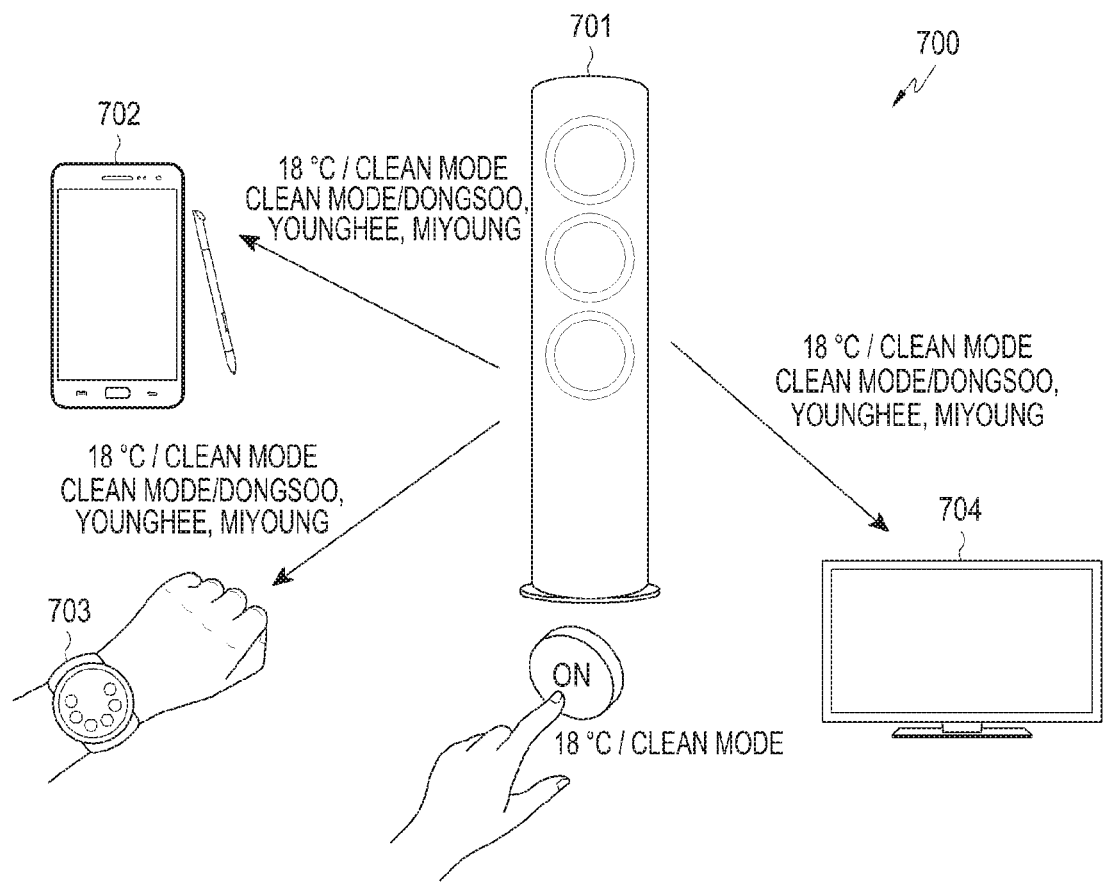

In FIG. 7d, since the air conditioner 701 has received the user information of the external devices from the external devices 702, 703, and 704, the air conditioner 701 may generate/update control state information to provide its control state information. Thereafter, the generated/updated control state information may be sent to the external devices 702, 703, and 704. In some embodiments, the user information contained in the control state information of the air conditioner 701 may include all the user information "Dongsoo, Younghee, Miyoung," received from the external devices in the corresponding control states. That is, before the air conditioner 701 receives the user information from the external devices 702, 703, and 704, the control state information generated by the air conditioner 701 may include "18° C./clean mode." However, after the air conditioner 701 receives the user information from the external devices 702, 703, and 704, the control state information updated by the air conditioner 701 may include "18° C./clean mode/Dongsoo, Younghee, Miyoung" and the updated control state information may be sent to the external devices 702, 703, and 704.

Now described is the operation of the device broadcasting its control state information to external devices according to an embodiment of the disclosure.

Figure 8:
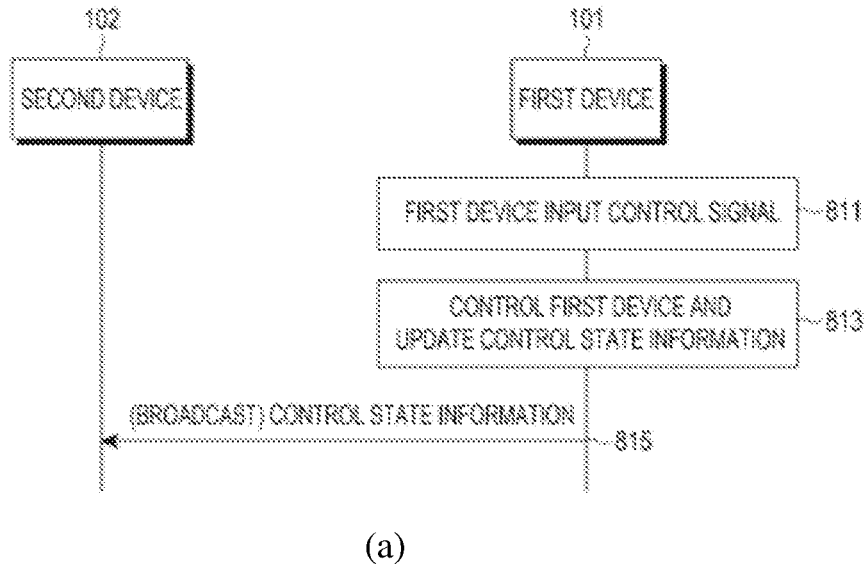
FIG. 8 is a view illustrating two cases in which a device broadcasts its control state information according to an embodiment of the disclosure.
Figure 8:
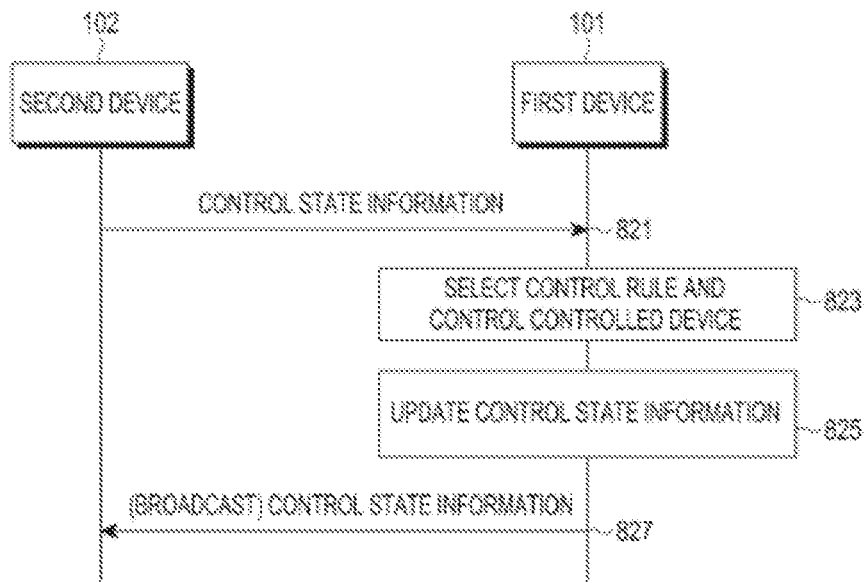

FIG. 8 is a view illustrating two cases in which a device broadcasts its control state information according to an embodiment of the disclosure.

In some embodiments, FIG. 8(a) illustrates the case in which, where the device is controlled by the user's control signal input, the corresponding control state information is broadcast. For example, where the first device 101 receives a control signal from the user in step 811, a control operation may be performed on the first device 101 based on the control signal and the control state information of the first device 101 may be updated in step 813, and the updated control state information may be broadcast to the external devices in step 815. However, FIG. 8(a) illustrates only the second device 102 as the external device for ease of description.

In some embodiments, FIG. 8(b) illustrates the case in which, where the device is controlled as per the control rule based on the control state information received from the second device 102, i.e., an external device, the control state information is broadcast to the external device. For example, the first device 101 may receive the control state information of the second device 102 from the second device 102 in step 821, and if there is a pre-stored control rule corresponding to the received control state information, the control rule may be selected and the first device 101 may be controlled as per the selected control rule in step 823. In step 825, the first device 101 may be controlled, and the control state information may be updated with the result of the control reflected. Thereafter, in step 827, the updated control state information of the first device 101 may be broadcast to the external devices.

As per the embodiments set forth above, each device individually generates and stores control rules and selects, on its own, a control rule and performs control based on control state information received from the external devices.

Now described are some variations to the above embodiments in which the devices are controlled as per the control rules through a separate entity called a control rule managing device to manage control rules. The control rule managing device may be a network electronic device, such as a server or relay, a gateway, router, or hub, or may be an electronic device (e.g., a TV, refrigerator, air conditioner, washer, or thermometer) with the same network functionality as the gateway, router, or hub, but is not limited thereto.

In some embodiments, where the entity is a gateway, the gateway may be installed in the place where the devices are installed, such as home or office, to control the devices. In some embodiments, where the entity is a server, the server might not be installed in the place where the devices are installed, such as home or office, to control the devices. That is, the server may be managed by the service provider and may be connected with the devices via wired or wireless communication including cellular communication or LAN. Variations to the embodiments of the disclosure are described with reference to FIG. 9.

Figure 9:
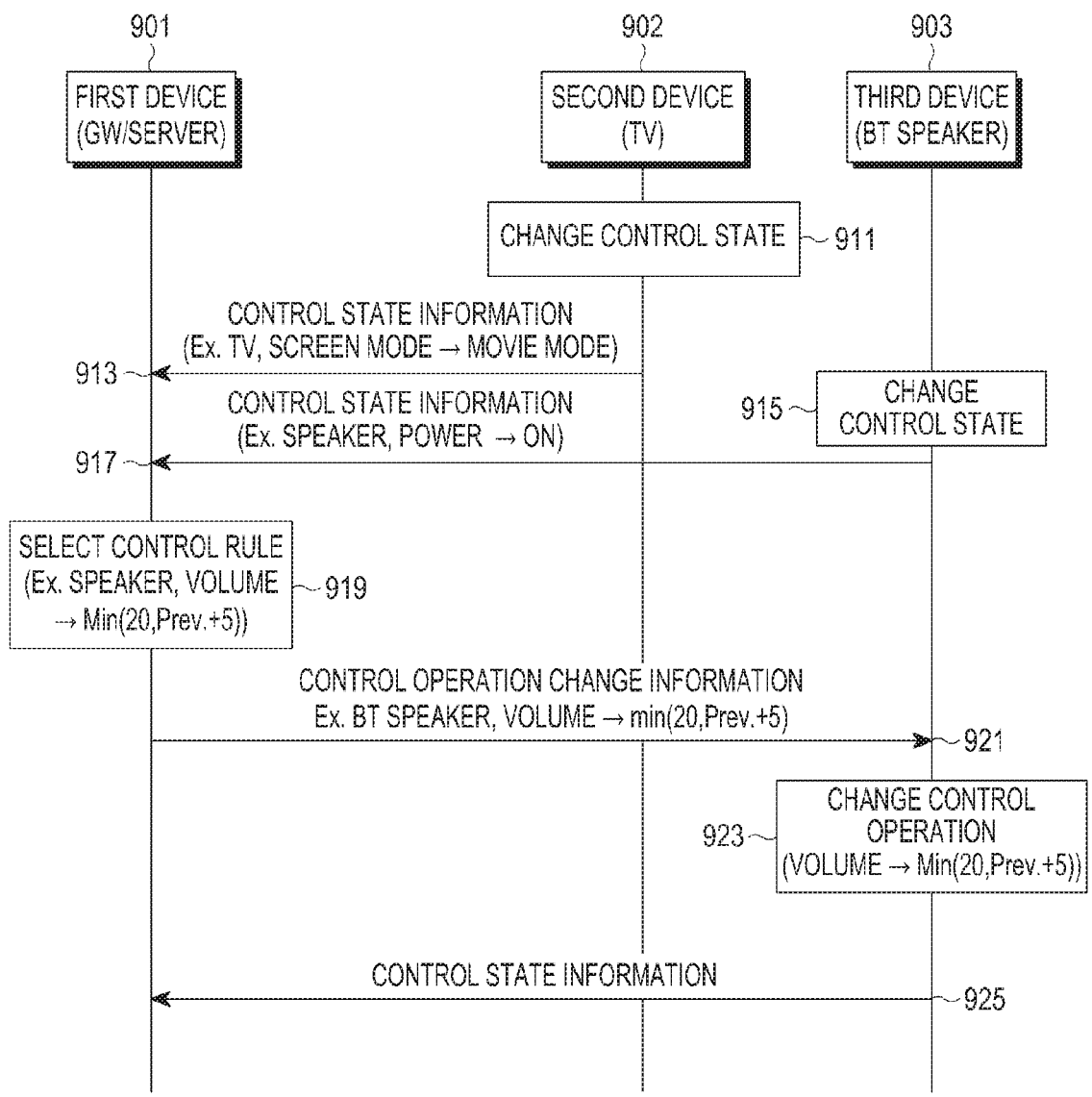
FIG. 9 is a view illustrating a device control scheme by a control rule managing device according to some embodiments of the disclosure.

FIG. 9 is a view illustrating a device control scheme by a control rule managing device according to some embodiments of the disclosure.

In the example of FIG. 9, the first device 901 may be a gateway or server. The gateway or server may collectively be referred to as a "control rule managing device." The control rule managing device may be implemented with the same or similar configuration to the device 300 described above in connection with FIG. 3. Meanwhile, although the second device 902 is the TV and the third device 903 is the bluetooth speaker as an example for description, this is merely for ease of description, and is not limited thereto.

If the control state of the second device 902 is changed in step 911, the second device 902 may transmit the control state information reflecting the changed control state to the first device 901 in step 913. FIG. 9 assumes that the screen mode of the TV has been changed to the movie mode as an example. If the control state of the third device 903 is changed in step 915, the third device 903 may transmit the control state information reflecting the changed control state to the first device 901 in step 917. FIG. 9 assumes that the bluetooth speaker has powered on, for example. Meanwhile, the second device 902 and the third device 903 may send their control state information to the first device 901 implemented as a gateway, or via a base station to the first device 901 implemented as a server, using, e.g., the domain address, IP, or MAC address of the first device 901, but rather than broadcasting the control state information.

In step 919, the first device 901 may select a control rule among pre-stored control rules based on at least one of the control state information received from the second device 902 and the second device 902. It is assumed here that as in the example of FIG. 2 described above, such a control rule is selected as increases the volume of the speaker by five as the volume adjustment unit. Meanwhile, the first device 901 may generate and pre-store control rules as set forth above.

That is, the first device 901 may receive control state information from other devices, analyze the received control state information, generate control rules, and store the control rules. The process of generating control rules by the first device 901 is the same as that described above, and no detailed description thereof is given. Thereafter, in step 921, the first device 901 may transmit control operation change information to the third device 903 based on the selected control rule. As used herein, "control operation change information" means information to change a control operation performed as per a control signal for a device. In some embodiments, where the third device 902 receives the control operation change information from the first device 901 unlike in the existing scheme where the volume is varied by one as the sound adjustment unit upon obtaining a control signal to increase the volume from the remote controller, the control operation for the control signal to increase the volume may be changed to increase the volume by five as the sound adjustment unit up to 20 as the volume indication unit. The control operation change information may include, but is not limited to, control type information that is information to indicate the type of the control operation to be changed and control operation information that is information for the changed configuration information. In step 923, the third device 903 performs the control operation as per the received control rule. Meanwhile, in step 925, the third device 903 transmits the control state information reflecting the result of the control operation back to the first device 901.

Expanded examples are described based on the above-described embodiments.

In one expanded example, a failure to receive control state information from an external device for a predetermined time may also be used as a control condition of the control rule.

For example, when an indoor light fails to receive control state information from an external device within a predetermined time, such a control rule may be set as to automatically turn on the light from 20 o'clock to 22 o'clock. The failure to receive control state information from an external device within a predetermined time may mean that nobody is in the house on the day. Thus, the indoor light may be rendered to automatically turn on for a predetermined time for security purposes or to turn off for power savings, but without being limited thereto.

In another expanded embodiment, the control operation contained in the control rule is not limited to the control operation for one device but rather may be implemented to control a plurality of devices in group. For example, where the TV is set to the movie mode, control commands for the relevant external devices may be included in the control state information broadcast from the TV so that the external devices related to the movie mode may be collectively controlled in a group. In some embodiments, as set forth above in connection with FIG. 2, the control state information may sequentially be delivered from the TV through the bluetooth speaker to the curtain, and the corresponding device needs to determine whether it corresponds to the control rule. However, as an expanded example, regardless of whether the bluetooth speaker and the curtain have control rules generated in relation to the movie mode of the TV, the control command for the bluetooth speaker and the control command for the curtain may be contained in the control state information of the TV so that the bluetooth speaker and the curtain may simultaneously be controlled. Meanwhile, in some embodiments, a plurality of homogeneous devices may be batch-controlled by the control rule related to particular control state information. For example, where the air conditioner powers on, and there is a rule to change all the windows in the house to the "close" state, all the homogeneous windows may be batch-controlled by the control rule. However, the homogeneous devices are not limited thereto.

Particular aspects of the present disclosure may be implemented as computer readable codes in a computer readable recording medium.

The apparatuses and methods according to embodiments of the present disclosure may be implemented in hardware, software, or a combination of hardware and software. The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The invention claimed is:

1. A method for controlling a first device, the method comprising:
   receiving, by the first device, control state information of a second device from the second device, the control state information including user information and control operation information indicating an operation mode performed by the second device;
   obtaining, through an input interface of the first device, a control signal indicating a first control operation of the first device;
   selecting a control rule to be applied to the first device among a plurality of control rules based on the obtained control signal, the control operation information and the user information associated with each of the plurality of control rules;
   changing the first control operation of the first device, being not performed by the first device, indicated by the control signal to a second control operation of the first device based on the selected control rule; and
   performing, by the first device, the second control operation based on the selected control rule,
   wherein the second control operation is determined based on an execution count of the selected control rule,
   wherein the performing of the second control operation further comprises executing the second control operation based on the execution count of the selected control rule being greater than or equal to a predetermined execution count threshold, and
   wherein the first device transmits the control state information of the second device and the second control operation of the first device to a third device.

2. The method of claim 1, further comprising:
   generating control state information of the first device based on a result of the second control operation; and
   broadcasting the generated control state information.

3. The method of claim 1, further comprising:
   generating and storing a control history of an external device based on control state information of the external device received from at least one or more external devices including the second device;
   generating and storing a control history of the first device based on the first control operation and the second control operation of the first device; and
   generating the control rule based on at least one of the control history of the external device and the control history of the first device.

4. The method of claim 1, wherein the control state information further includes device information including device type information and device unique identifier (UID) information and device control information including control type information.

5. The method of claim 4, wherein the control state information further includes control count information.

6. A first device comprising:
   communication circuitry; and
   a processor configured to:
   receive control state information of a second device from the second device through the communication circuitry, the control state information including user information and control operation information indicating an operation mode performed by the second device,
   obtain, through an input interface of the first device, a control signal indicating a first control operation of the first device,
   select one control rule to be applied to the first device among a plurality of control rules based on the obtained control signal, the control operation information and the user information associated with each of the plurality of control rules,
   change the first control operation of the first device, being not performed by the first device, indicated by the control signal to a second control operation of the first device based on the selected control rule, and
   perform the second control operation on the first device based on the selected control rule,
   wherein the second control operation is determined based on an execution count of the selected control rule,
   wherein the performing of the second control operation further comprises executing the second control operation based on the execution count of the selected control rule being greater than or equal to a predetermined execution count threshold, and
   wherein the processor is further configured to control the communication circuitry to transmit the control state information of the second device and the second control operation of the first device to a third device.

7. The first device of claim 6, wherein the processor is further configured to generate control state information of the first device based on a result of the second control operation executed, and to broadcast the generated control state information.

8. The first device of claim 6, wherein the processor is further configured to generate and store a control history of an external device based on control state information of the external device received from at least one or more external devices including the second device, to generate and store a control history of the first device based on the first control operation and the second control operation of the first device, and to generate the control rule based on at least one of the control history of the external device and the control history of the first device.

9. The first device of claim 6, wherein the control state information further includes device information including device type information and device unique identifier (UID) information and device control information including control type information.

10. The first device of claim 9, wherein the control state information further includes control count information.

11. A device comprising:
communication circuitry;
a storage; and
a processor configured to:
transmit control state information of the device to a control rule managing device through the communication circuitry, the control state information including user information and control operation information indicating an operation mode performed by the device,
receive control operation change information for the device from the control rule managing device through the communication circuitry, the control operation change information including a control rule selected among a plurality of control rules based on the control operation information and the user information associated with each of the plurality of control rules,
change a first control operation of the device, being not performed by the device, to a second control operation of the device based on the received control operation change information,
store the second control operation in the storage, and
perform the second control operation on the device,
wherein the second control operation is determined based on an execution count of the selected control rule,
wherein the processor is further configured to perform the second control operation based on the execution count of the selected control rule being greater than or equal to a predetermined execution count threshold, and
wherein the device transmits the control operation change information received from the control rule managing device to a second device.

* * * * *